United States Patent [19]

Kah, Jr.

[11] 4,366,944

[45] Jan. 4, 1983

[54] MAGNETICALLY ACTUATED PILOT VALVE

[76] Inventor: Carl L. C. Kah, Jr., 778 Lakeside Dr., North Palm Beach, Fla. 33408

[21] Appl. No.: 294,947

[22] Filed: Aug. 21, 1981

Related U.S. Application Data

[62] Division of Ser. No. 973,299, Dec. 26, 1978, Pat. No. 4,310,023.

[51] Int. Cl.$^3$ .............................................. F16K 31/08
[52] U.S. Cl. ................................. 251/141; 137/625.5; 137/625.65; 251/65
[58] Field of Search ........................ 137/625.5, 625.65; 251/65, 141

[56] References Cited

U.S. PATENT DOCUMENTS 4,005,733 2/1977 Riddel ........................ 137/625.65 X

FOREIGN PATENT DOCUMENTS 215601 4/1968 U.S.S.R. ........................ 137/625.65
319791 11/1971 U.S.S.R. ................................. 261/65
627248 8/1978 U.S.S.R. ........................ 137/625.65

Primary Examiner—Gerald A. Michalsky
Attorney, Agent, or Firm—Jack N. McCarthy

[57] ABSTRACT

A magnetically actuated pilot valve for fluid control systems which can direct a fluid pressure for operating a device or it can connect said device to drain. The magnetically actuated pilot valve includes a top and bottom section with fluid pressure entering the top section, a connection to drain extending from the bottom section, and a connection to a device to be operated enters a chamber between the two parts; an armature plate, rectangular-shaped or circular, is movable between two positions, one position closing off the fluid pressure, while the other position closes off the connection to drain; the armature plate is drawn to one position by energizing a wire coil whose magnetic flux path is connected to two pole pieces for actuation of the armature plate, while a spring means biases the armature plate to its other position when the wire coil is de-energized; one end of the armature plate is maintained close to one pole piece to minimize the air gap in the magnetic flux path for high resultant pull on the armature plate. While three connections are set forth above, the device can be used with two connections as an open-closed valve.

In another modification, a magnetized armature plate can be used with a direct current supply. A U-shaped metallic member can be located on the opposite side of said armature plate from said pole pieces to aid in armature movement and for latching the armature in the dump closed position without the use of a spring means. A single pole modification is also shown.

1 Claim, 9 Drawing Figures

MAGNETICALLY ACTUATED PILOT VALVE

This is a division, of application Ser. No. 973,299, filed Dec. 26, 1978, now U.S. Pat. No. 4,310,023.

BACKGROUND OF THE INVENTION

Small pilot valves of the type disclosed in this application are presently being operated by solenoid-type coils where a plunger is pulled against a pole piece inside the coil. A valve of this type is shown in U.S. Pat. No. 3,598,360.

SUMMARY OF THE INVENTION

A primary object of the present invention is to provide a pilot valve which will be magnetically actuated having a very short air gap in the magnetic flux path providing a high actuation force with a low number of ampere-turns.

A further object of the invention is to provide a magnetically actuated pilot valve which is less susceptible to dirt contamination and mechanical sliding friction.

Another object of the invention is to provide a magnetically actuated pilot valve having an armature plate located for movement in a chamber which can be moved between a position closing an opening or opening it. Said armature plate being biased by a spring to one position and moved to its other position by magnetic flux passing through two permanent magnet pole pieces positioned adjacent said armature plate.

A further object of this invention is to have the pole pieces spaced at different distances from said armature plate so that one pole piece will be substantially touching the armature plate at all times.

Another object of the invention is to provide a magnetically actuated pilot valve having a single pole for use with an armature plate.

DESCRIPTION OF THE PREFERRED EMBODIMENT

Figure 1:
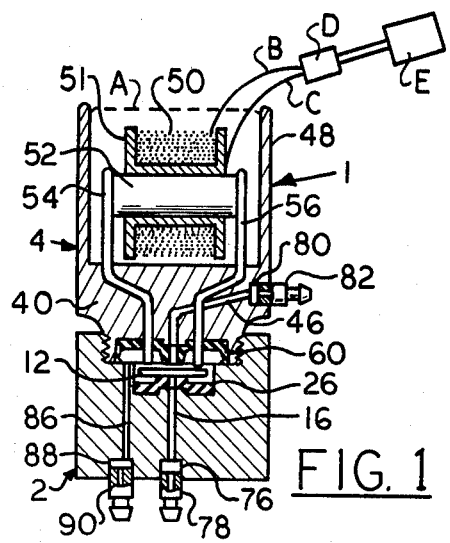
FIG. 1 is a sectional view taken through the magnetically actuated pilot valve showing the invention.

A magnetically actuated pilot valve 1 is formed having a housing consisting of two main parts, a bottom part 2 and a top part 4. The bottom part 2 includes a cylindrical bore 6 which is internally threaded and has a bottom surface 8. A substantially rectangular-shaped recess 10 is located in the center of the bottom surface 8 of the bore 6. An armature plate 12 is positioned for movement in said recess 10.

The bottom of the recess 10 is formed having a short cylindrical projection 14 at the center thereof with said bottom part 2 having a passageway 16 extending to and forming a center opening in the short cylindrical projection 14.

Figure 2:
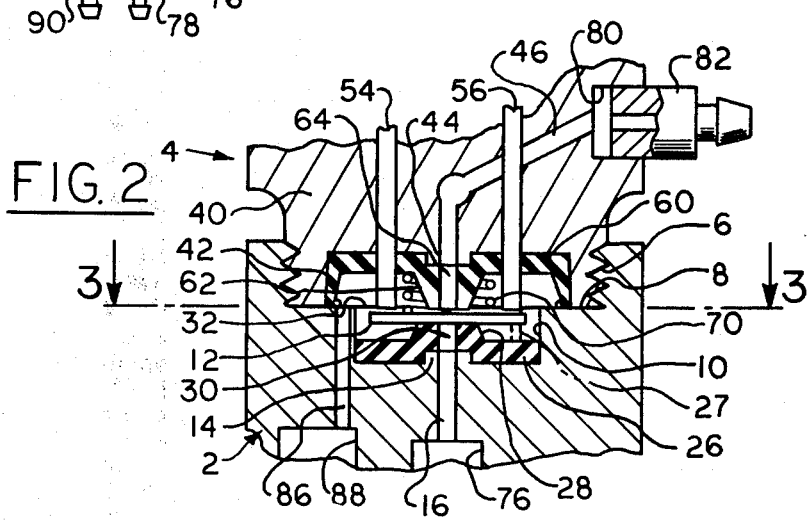
FIG. 2 is an enlarged view of a portion of FIG. 1 showing the degree of movement of the armature plate.
Figure 5:
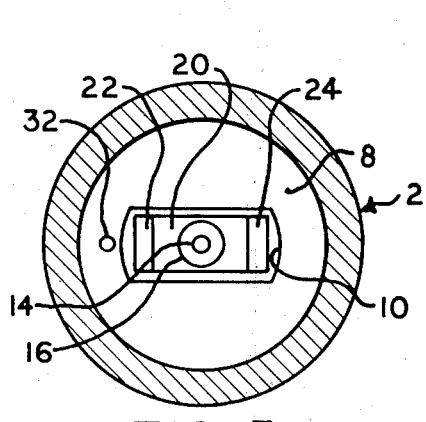
FIG. 5 is a view taken along the line 5—5 of FIG. 4, with the armature plate and resilient grommet removed.

A resilient grommet 26 is placed against the bottom of said recess 10 with a cylindrical recess in the bottom thereof engaging and sealing with the short cylindrical projection 14. The center of the resilient grommet 26 has an upwardly extending projection 28, said projection 28 having a passage 30 extending therethrough which is an extension of the passageway 16. Said upwardly extending projection 28 extends into the recess 10 a distance which will permit movement of the armature plate 12 within the top of the recess 10. As can be seen in FIG. 2, the armature plate 12 rests upon the top of the projection 28 for closing the end of passage 30.

The top part 4 includes a threaded projection 40 which is externally threaded to engage the internal threads of the cylindrical bore 6 of the bottom part 2. The threaded projection 40 has a cylindrical recess 42 which is axially aligned with the center of the rectangular-shaped recess 10 when the two parts are threadably engaged. The recess 42 is of such a size to permit an opening 32 located in the bottom surface 8 of cylindrical bore 6 to open into said recess 42.

The closed end of the recess 42 has a short cylindrical projection 44 at the center thereof with said upper part 4 having a passageway 46 extending to and forming a center opening in the short cylindrical projection 44. The upper portion of the top part 4 is formed as a cylindrical housing 48. A wire coil 50 on a spool 51 is mounted on a core member 52 which is in turn fixed at each end to a pole piece 54 and 56, respectively. Each pole piece 54 and 56 extends into and is embedded in the portion of the top part 4 between the cylindrical housing 48 and recess 42. Pole pieces 54 and 56 project into the recess 42 and are aligned each with one end of armature plate 12. Where the armature plate 12 is positioned in a rectangular-shaped recess 10, indicating means are provided between bottom part 2 and top part 4 of the housing so that the pole pieces 54 and 56 are properly aligned with the armature plate 12 in the substantially rectangular-shaped recess 10. Any known means for indicating the positioning of the pole pieces 54 and 56 with respect to the armature plate 12, can be used along with any known holding means. One indicating means is the use of matching lines, one on the top part 4 and one on the bottom part 2. A holding means can be the use of a projection on the top part 4 which will be held in a groove in bottom part 2, when the two parts 2 and 4 are properly positioned. The upper part of the pole pieces 54 and 56, along with the core member 52 and wire coil 50, are located within the cylindrical housing 48 and after they are positioned therein, the cylindrical housing is filled with a hardening or moisture barrier agent, such as Hysol solenoid potting or silicone rubber up to the top of the cylindrical housing 48 to the line A. The end wires B and C extend from the top of the hardening agent and are available to be connected to an alternating or direct current source E by an on-off switch D. While the on-off switch can be manually operated, it can also be connected to controlled timers for actuation of the on-off switch when desired.

Figure 3:
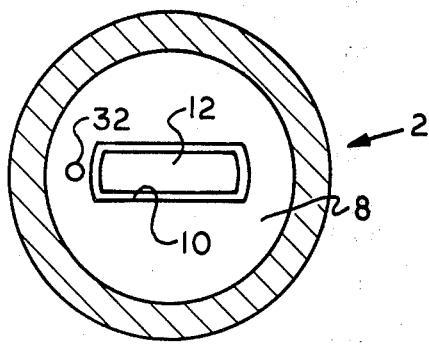
FIG. 3 is a view taken along the line 3—3 of FIG. 2 showing the armature plate located in its housing recess.

Resilient grommet 60 is placed against the closed end of said recess 42 with a cylindrical recess in the bottom thereof engaging and sealing with the short cylindrical projection 44. Openings therein permit the pole pieces 54 and 56 to extend downwardly therethrough; said pole pieces 54 and 56 being approximately the width of the armature plate 12 (see FIG. 3). The center of the resilient grommet 60 has a downwardly extending projection 62 between the pole pieces 54 and 56, said projection 62 having a passage 64 which is an extension of the passageway 46. A spring 70 is positioned around projection 62 with one end against the grommet 60 and the other end against armature plate 12 to bias it against the end of passage 3 preventing flow therethrough. To prevent accidental tilting of the armature plate 12 which would open the end of passage 30, a projection 27 could extend from the grommet 26 to a point just under the armature plate 12 in line with the pole piece 56 (see phantom showing in FIG. 2). The downwardly extending outer skirt extends below the end of top part 4 and seals with the bottom of the recess 10.

The end of pole piece 56 extends to a location above the end of armature plate 12 so that one edge just touches or is very close to the armature plate and the end of pole piece 54 extends to a location above the other end of armature plate 12, permitting a larger amount of movement. The ends of the pole pieces 54 and 56, along with the downwardly extending projection 62, have their flat ends located on a plane extending at an angle to the top of armature plate 12 as it is held against the top of projection 28 by spring 70 (see FIG. 2).

In a typical construction, the lower end of pole pieces 56 would be located in very close proximity to the armature plate 12, while a 0.030 inch gap would occur between the end of projection 62, and the top of armature plate 12, and a 0.060 inch gap would occur between the end of pole piece 54 and the top of armature plate 12 (these distances being at the center of the projection 62 and pole piece 54). The distance betweeen the center of each pole piece and center of projection 28 should be 0.150 inches while the length of the armature 12 should be approximately 0.4 inches.

It can be seen that when the armature plate 12 is held against the ends of pole pieces 54 and 56, it will close the end of passage 64 in a similar manner as it closes the end of passage 30. The angular movement of the armature plate 12 between its position as shown in FIG. 2 and its position against the ends of pole pieces 54 and 56 and projection 62 with its one end always being located as close to pole 56 as possible, forms a better magnetic flow area between the armature plate 12 and the ends of pole pieces 54 and 56. When the wire coil 50 is energized, the armature plate 12 is pulled upwardly against the pole pieces 54 and 56 to seal the end of passage 64, and when it is de-energized, the spring 70 biases the armature plate 12 downwardly to seal the end of passage 30.

The passageway 16, connected to passage 30, has its other end connected to a cylindrical opening 76 which has a connector insert 78 fixed therein to which a tube can be connected. The passageway 46 connected to passage 64 has its other end connected to a cylindrical opening 80 which has a connector insert 82 fixed therein to which a tube can be connected. Opening 32 in the bottom surface 8 is connected by a passageway 86 to one end of a cylindrical opening 88 which has a connector insert 90 fixed therein to which a tube can be connected.

In the magnetically actuated valve shown, connector insert 82 can have its tube connected to a pressure source, while connector 90 is connected to a device for operation, and connector insert 78 is opened to dump. When the wire coil 50 is energized by an alternating current or direct current source, the armature plate 12 is attracted to pole pieces 54 and 56, closing the end of passage 64 and connecting connector insert 90 to connector insert 78, thereby connecting the device for operation to drain and when the wire coil 50 is de-energized, the armature plate 12 is biased to close the end of passage 30 and connects connector insert 82 to connector insert 90 to direct a pressure to a device for operation.

Figure 4:
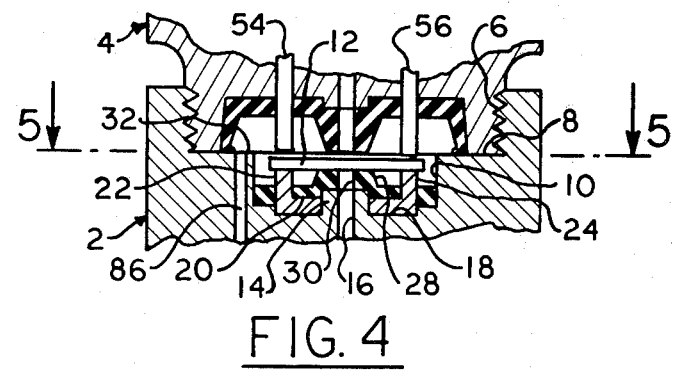
FIG. 4 is a fragmentary view of a section of FIG. 2 showing a modification of the invention.

In FIG. 4 a modification is shown wherein the bottom of the recess 10 is further recessed at 18 with said recess 18 extending around the short cylindrical member 14. A metal member 20 having a width substantially that of armature plate 12 is contoured to fit in said recess 18 with an opening at the center thereof, extending over the short cylindrical member 14, while its top surface is level with the bottom surface of the recess 10. The metal member 20 has two upwardly projecting arms 22 and 24. These arms are also approximately the width of the armature plate 12 and pole pieces 44 and 56. Openings in resilient grommet 26 permit the arms 22 and 24 to extend upwardly therethrough, with the arms 22 and 24 being in line with the pole pieces 54 and 56, respectively. The arms 22 and 24 project to a point a slight bit lower than the projection 28 so that the armature plate 12 will close the end of opening 30 while being magnetically held in place by arms 22 and 24. In this modification, the armature plate 12 is magnetized, having a north end and a south end, and only a direct current is used. Further no spring is necessary in this modification. Also, in this modification, the on-off switch D is replaced by a device which will, when desired, momentarily connect the source E to the wires B and C at one polarity, then, when desired, momentarily connect the source E to the wires B and C at the opposite polarity. This changing of polarity can be manually initiated or automatically by a timing device. This construction permits latching, in that it will not be necessary to continually apply electric current to the coil 50. The direct current will move the armature plate 12 to its desired position, either against pole pieces 54 and 56 or against arms 22 and 24 by controlling polarity, and the armature plate 12 will be held in position without the direct current since it is a permanent magnet.

The armature plate 12 is moved to one position or the other as determined by the polarity of the direct current in the coil, which in turn determines the magnetic polarity of pole piece 54 or 56. If the armature plate 12 is a permanent magnet with its north pole at the left end, then, when the coil is energized and pole piece 54 is a south pole, the armature plate 12 is attracted thereto and is pulled up making mechanical contact with pole pieces 54 and 56, completing a strong metal flux path loop. The armature plate 12 thus remains in place even after the electric current in the coil is turned off. When the polarity of direct current in the coil is such that pole piece 54 is a north pole, it repels the left end of the armature plate 12 (which is also a north pole). If the bottom magnetic flux path bar or member 20 is in place, then the armature plate 12 strikes the left end 22 of the flux bar, or member, 20, and a metal-to-metal strong flux path is set up by the permanent magnetic armature plate 12 holding it in the down position even after the direct current stops flowing through the coil. The repelling force of pole 54 is complemented by an attraction force of arm 22 of the flux bar, or member, 20, which brings the magnetic polarity of pole piece 56 around to attract the armature plate 12 while the coil is energized with a polarity to make pole 54 repel the armature plate 12 in this example.

An alternate configuration would be to make the pole pieces 54 or 56, or the coil core member 52, a permanent magnet. The armature plate 12 would then not be made a permanent magnet. When the coil was energized in a reinforcing polar direction, the armature plate 12 would be drawn up to pole pieces 54 and 56 and held there by the permanent magnetic field. When the coil current produced a canceling magnetic field to that of the permanent magnet pole piece, the armature plate 12 would be dropped and forced down by a spring.

While in FIGS. 2 and 4 three openings, opening 32, the end of passage 64, and the end of passage 30, have been shown entering the cavity formed between the two resilient grommets 26 and 60, it is to be understood that one of the openings can be removed, such as the end of passage 64, leaving only the opening 32 and the end of passage 30, so that the magnetically actuated pilot valve will become, in effect, an on-off valve with the armature plate 12 merely permitting, or not permitting, flow between the two openings.

It is to be further understood that the modification shown in FIG. 2 can have the armature plate 12 magnetized with only direct current being used.

Figure 6:
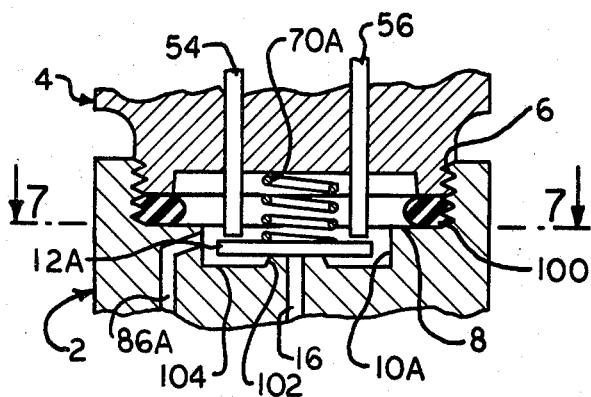
FIG. 6 is a fragmentary view of a section of FIG. 2 showing another modification of the invention.
Figure 7:
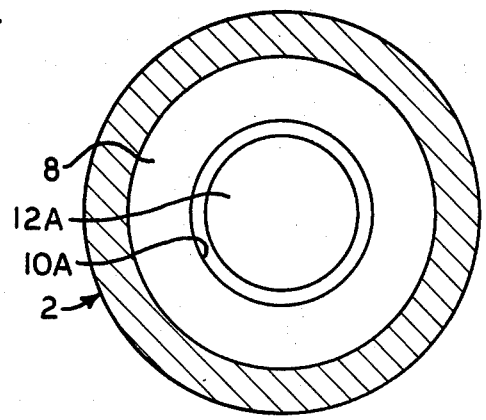
FIG. 7 is a view taken along the line 7—7 of FIG. 6 showing a circular armature plate.

In FIG. 6, another modification is shown wherein no grommets are used. An O-ring 100 is placed between the end of top part 4 and the bottom surface 8 of the threaded cylindrical bore 6 to provide the sealing function of the circular end of grommet 60 with surface 8 in FIG. 2. A circular recess 10A is located in the center of the bottom surface 8 of the bore 6. A circular armature plate 12A is positioned for movement in said recess 10A. A small projection 102 extends upwardly from the bottom of the recess 10A which has the passageway 16 extending thereto forming a center opening in the projection 102. The bottom of the circular armature plate 12A has a resilient layer 104 on the bottom thereof for forming a seal with the opening in projection 102. This resilient layer 104 can be a separate piece bonded on, or it can be coated on to the bottom of the circular armature plate 12A. A spring 70A performs the same function as spring 70 and maintains the armature plate 12A against the opening in projecton 102 when the coil 50 is not energized. When the coil 50 is energized, the circular armature plate 12A is pulled upwardly against the pole pieces 54, 56, forming a connection between passageway 86A and passageway 16.

Figure 8:
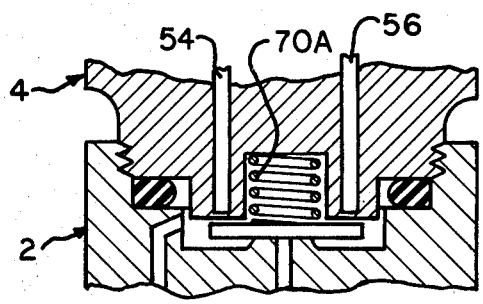
FIG. 8 is a view similar to FIG. 6 showing a further modification of the invention having embedded pole pieces.

FIG. 8 is a modification similar to that shown in FIG. 6 wherein pole pieces 54 and 56 have their free ends embedded in the top part 4. This prevents leakage along the pole pieces 54 and 56.

Figure 9:
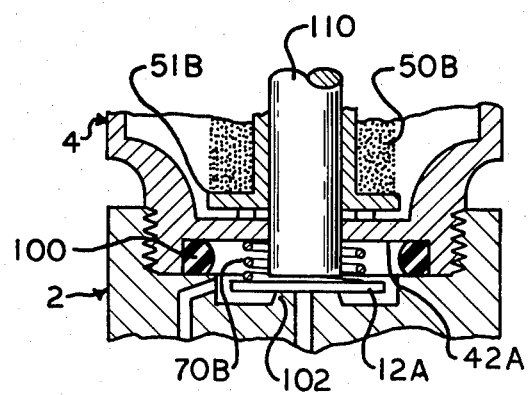
FIG. 9 is a fragmentary view similar to that of FIG. 2 showing a modification having a single pole.

FIG. 9 is a modification showing a single pole construction. While the part 2 is similar to that shown in FIG. 6, the upper part 4 has a single pole 110 extending below the recess 42A to a point just above the circular armature plate 12A. The O-ring 100 performs the same function as the O-ring 100 of FIG. 6, even though they are placed between different locations on bottom part 2 and top part 4. A spring 70B is positioned around single pole 110 and maintains the armature plate 12A against the opening in projection 102 when the coil 50B is not energized. The coil 50B is wound on a spool 51B which is positioned over the single pole 110. The cylindrical housing in this modification is also filled with the hardening or moisture barrier agent such as discussed previously.

I claim:

1. A magnetically actuated pilot valve having a housing, said housing having two parts, means connecting said two parts together, a chamber being located between said two parts, a first passage having a first opening into said chamber from one part thereof, an armature plate positioned in said chamber against said first opening to close said first opening, pole piece means extending into said chamber toward said armature plate, said pole piece means having a spacing with the armature plate when it is against said first opening, a second passage having a second opening into said chamber, spring means for biasing said armature plate against said first opening, said pole piece means including two pole pieces extending into said chamber toward the same side of said armature plate, each pole piece having a free end, the free end of one of said pole pieces being located closer to one location on the edge of the armature plate when it is positioned in said chamber against said first opening to close said first opening than the free end of the other pole piece which is spaced further from another location on the edge of the armature plate when it is positioned in said chamber against said first opening to close said first opening, means for magnetically energizing said pole piece means to move said armature plate away from said first opening and against the free ends of said two pole pieces, said pole piece means being formed as a permanent magnet for latching the armature plate, means for magnetically energizing said pole piece means to overpower the magnetic flux flow of said permanent magnet to release the armature plate so that said armature plate will be placed against said first opening by said biasing means.

* * * * *